United States Patent [19]

Cassidy

[11] Patent Number: 4,896,932
[45] Date of Patent: Jan. 30, 1990

[54] METHOD OF FORMING AN OPTICAL FIBRE JUNCTION

[75] Inventor: Stephen A. Cassidy, Ipswich, England

[73] Assignee: British Telecommunications Public Limited Company, England

[21] Appl. No.: 279,158

[22] PCT Filed: Mar. 31, 1988

[86] PCT No.: PCT/GB88/00259
§ 371 Date: Nov. 21, 1988
§ 102(e) Date: Nov. 21, 1988

[87] PCT Pub. No.: WO88/07690
PCT Pub. Date: Oct. 6, 1988

[30] Foreign Application Priority Data

Apr. 2, 1987 [GB] United Kingdom ............. 8707853

[51] Int. Cl.$^4$ ............................................. G02B 6/26
[52] U.S. Cl. .............................. 350/96.15; 350/96.29
[58] Field of Search .............. 350/96.15, 96.29, 96.20, 350/96.33

[56] References Cited

U.S. PATENT DOCUMENTS

| 4,589,725 | 0/1986 | Dyott | 350/96.15 |
| 4,601,541 | 7/1986 | Shaw et al. | 350/96.15 X |
| 4,673,270 | 6/1987 | Gordon | 350/96.15 |

FOREIGN PATENT DOCUMENTS 2507787 12/1982 France .
2030318 4/1980 United Kingdom .

OTHER PUBLICATIONS

Patents Abstracts of Japan, vol. 3, No. 124 (E-144), Oct. 17, 1979, p. 141 & JP, A, 54101334, (Nippon Denshin Denwa Kosha), Sep. 8, 1979.

Patents Abstracts of Japan, vol. 8, No. 109 (P275), (1546), May 22, 1984, & JP, A, 5918921 (Nippon Denshin Denwa Kosha), Jan. 31, 1984.

Primary Examiner—John D. Lee
Assistant Examiner—Phan T. Heartney
Attorney, Agent, or Firm—Nixon & Vanderhye

[57] ABSTRACT

A method of preparing a junction between the cores of two D-optical fibers comprises bending a first fiber around a curved surface and causing its flat face to face outwards, superposing a second D-fiber on the first fiber, bending the second fiber around the curved surface causing its flat face to fact towards the curved surface, and controlling the lateral position of the superposed fibers on the curved surface to provide a predetermined separation between the cores of the fibers. When both fibers are arranged in a plane normal to the axis of the curved surface the flat faces of both fibers lie strictly parallel to the surface and thus the flat faces of both superposed fibers are substantially in contact with one another so that the cores of both fibers are close together. However, when at least one fiber is deflected from a normal plane the flat face of the fiber tilts with respect to the cylindrical surface with the degree of tilt being proportional to its lateral deviation and the sense in which the fiber tilts being dependent upon the direction of its deviation. This effect is used to obtain a precise and predetermined separation between the cores of the superposed fibers.

9 Claims, 1 Drawing Sheet

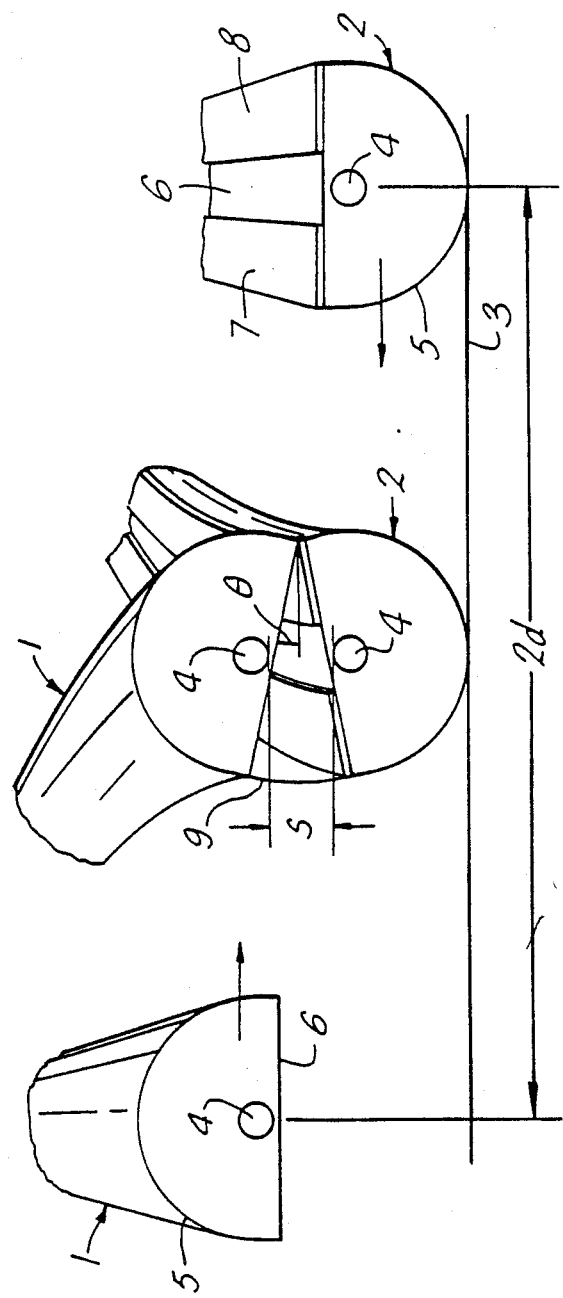

METHOD OF FORMING AN OPTICAL FIBRE JUNCTION

BACKGROUND AND SUMMARY OF THE INVENTION

D-optical fibres are clad fibres in which the cladding on one side of the core is considerably reduced in thickness. This may be done by polishing away the cladding from the one side of the fibre to provide a fibre with D-shaped cross-section or it may be done by drawing the fibre from a substrate having a D-shaped cross-section. D-optical fibres are typically used where it is required to couple light from one fibre to another fibre. Thus, D-fibres are used in the production of optical couplers and optical switches and in such circumstances two D-optical fibres are placed with their flat faces towards one another and with their cores at a particular separation. Depending upon the separation of the cores and the refractive index of any material interposed between the cores the degree of optical coupling that occurs between the cores is controlled.

As a result of the cross-sectional shape of such fibres they have a different bending moment in the plane containing their flat faces and the axis of the fibre from that in the plane which is normal to the flat face and also contains the axis of the fibre. Thus, the fibre is more flexible when bending in the plane normal to its flat face and less flexible when bending in a plane containing its flat face. The present invention is based upon the use of this phenomenon to provide a method by which such pairs of fibres can be accurately positioned with respect to one another.

According to this invention a method of preparing a junction between the cores of two D-optical fibres comprises bending a first fibre around a curved surface and causing its flat face to face outwards, superposing a second D-fibre on the first fibre, bending the second fibre around the curved surface causing its flat face to face towards the curved surface, and controlling the lateral position of the superposed fibres on the curved surface to provide a predetermined separation between the cores of the fibres.

Preferably the curved surface is curved in only a single sense and thus is formed by the surface of a prism having a parabolic, eliptical, or circular cross-section. To facilitate the subsequent description of the present invention only a cylindrical surface will be described but corresponding arrangements can be made with surfaces generated by parabolas and elipses.

When the two superposed fibres are arranged in a plane normal to the axis of cylindrical curved surface the flat faces of both fibres lie strictly parallel to the cylindrical surface and thus the flat faces of both superposed fibres are substantially in contact with one another so that the cores of both fibres are close together. This condition can also be achieved if both superposed fibres follow a helical path around the cylindrical surface and both include the appropriate twist to ensure that their flat faces are again parallel to the cylindrical surface. With the flat faces of the two fibres superposed and together the cores of the two fibres are close together so that light is coupled between them. Thus, by arranging both fibres in a plane normal to the axis of the curved surface and superimposing them, it is possible precisely to align the flat faces of the two fibres ensuring that their flat faces are substantially in contact.

However, when a fibre is deflected from a normal plane or a helical path with appropriate twist or follows a helical path without the fibre having the appropriate twist the flat face of the fibre tilts with respect to the cylindrical surface. The degree of tilt of the fibre is proportional to its lateral deviation along the curved surface and the sense in which the fibre tilts is dependent upon the direction of its deviation. This effect is used to enable a precise and predetermined separation between the cores of the superposed fibres to be obtained. Thus, by deflecting one fibre or both of the fibres in opposite directions, along the curved surface, relative tilting occurs between the superposed fibres with the result that their cores are separated by a predetermined amount.

For reasonably small deviations there is a direct relationship between the deviation imposed on the fibre and the separation that is thereby created between the cores of superposed fibres by the tilting of the flat face of at least one fibre with respect to the cylindrical surface. This enables the cores of the fibres to be separated by a small distance, typically between 1 and 5 $\mu$m, with a considerable degree of accuracy. With typical standard telecommunication grade fibre having a cladding diameter of 125 $\mu$m a core diameter of 0.8 $\mu$m and a refractive index difference between core and cladding of 0.004, a tilt of the flat face of one or both fibres so that their included angle is one degree provides a separation between the opposed faces of the fibres adjacent the core region of 1 $\mu$m, and so on for small angles. To a first approximation the angular tilt $\theta$ of each fibre is given by: $\theta = d/R$ where d is the lateral deviation imposed on the superposed fibres and R equals the radius of the cylindrical surface around which the fibres are bent. Thus with the present invention the separation of the cores of the fibres which have to be accurate to micron dimensions are governed by the macroscopic features of its fabrication which, typically have millimeter dimensions.

As an example of the way in which this can be achieved one fibre may lie in a plane normal to the axis of the curved surface whilst the other fibre also lies in a plane normal to the axis of the curved surface but is displaced axially along the curved surface. By then causing the other fibre to deviate from its path and superposing it on top of the one fibre, the flat face of the other fibre is tilted with respect to the curved surface and that of the one fibre, the angle of tilt and hence the separation of the cores of the two fibres being proportional to the initial axial separation. The other fibre may also lie on a helical path. Alternatively both fibres may be moved towards one another until they are superposed and so both deviate from their initial position in opposite directions. This causes the fibres to tilt in opposite senses. A similar effect can be achieved by having both fibres follow a helical path of opposite hand.

The space between the flats of the two fibres when their opposed faces are tilted with respect to one another may be filled by an optical material the refractive index of which changes with temperature or changes upon illumination by light so that the coupling between the two fibres varies with temperature or varies when illuminated by light. More usually the material interposed between the flat faces of the two fibres is one the refractive index of which varies with an applied electric field such as lithuium niobate or a liquid crystal and, in this case, electrodes are provided to subject this material to an electric field so that, in response to an applied electric field its refractive index changes and hence the optical coupling between the cores of the two fibres changes. Preferably such electrodes are formed directly on the flat face of one or both fibres.

BRIEF DESCRIPTION OF THE DRAWINGS

One example of an optical fibre junction will now be described with reference to the accompanying drawing which is a diagrammatic perspective view illustrating the formation of the junction.

DETAILED DESCRIPTION OF A PRESENTLY PREFERRED EXEMPLARY EMBODIMENT

Two D-optical fibres 1 and 2 are curved around a cylindrical surface 3 and both lie in planes normal to the axis of the cylindrical surface 3. The fibres 1 and 2 are separated by an axial distance 2d. Both fibres 1 and 2 include a core 4 and a cladding 5 having a flat face 6. The fibre 2 includes two strip electrodes 7 and 8 formed along opposite edges of its flat face. Alternatively electrodes 7 and 8 may be transparent and one cover the entire face 6 of the fibre 1 and the other cover the entire face 6 of the fibre 2.

To form the optical fibre junction both fibres 1 and 2 are displaced towards one another to the position shown in the centre of the FIGURE. As both fibres 1 and 2 are displaced from a plane normal to the axis of the curved surface 3 they tilt in opposite senses so that, when an overlapping region of the two fibres are superposed their flat faces 6 are inclined towards one another. The angle $\theta$ by which the face 6 of each fibre 1 and 2 is tilted with respect to the curved surface 3 is given by $$\theta = d/R$$

where d is the axial deviation imposed on each fibre 1 and 2 and R is the radius of curvature of the cylindrical surface 3. For small angles the separation s between the cores 4 of the two fibres 1 and 2 is given by $$s = 2r\theta$$

where r is the radius of the fibre. Taking as one specific example a standard telecommunication grade fibre having a cladding diameter of 125 $\mu$m and a core diameter of 0.8 $\mu$m the radius of curvature of the cylindrical surface to be equal to 60 mms and the initial separation, 2d, between the two fibres tp be equal to 2 mms the separation s between the cores 4 of the superposed fibres is equal to 2 microns.

To turn the optical fibre junction shown in the FIGURE into a switch the junction is immersed in liquid crystal material or, liquid crystal material is interposed between the inclined faces 6 of the fibres 1 and 2 and held in position by capilliary action. In response to a potential difference applied to the electrodes 7 and 8 the refractive index of the liquid crystal 9 varies. Typically, with a standard grade telecommunications fibre where there is a difference in refractive index between the core and the cladding of 0.004 a liquid crystal having a refractive index capable of changing between 1.450 and 1.443 is used. Typically in such a switch the length of the overlap between the cores of the fibres 1 and 2 is around 5 mm.

I claim:

1. A method of preparing a junction between the cores of two D-optical fibres comprising bending a first fibre around a curved surface and causing its flat face to face outwards, superposing a second D-fibre on the first fibre, bending the second fibre around the curved surface causing its flat face to face towards the curved surface, and controlling the lateral position of the superposed fibres on the curved surface to provide a predetermined separation between the cores of the fibres.

2. A method according to claim 1, in which the curved surface is curved in only a single sense and has a parabolic, eliptical, or circular cross-section.

3. A method according to claim 1 or 2, in which the two superposed fibres are arraned in a plane normal to the axis of the curved surface so that the flat faces of both fibres lie strictly parallel to the curved surface and thus the flat faces of both superposed fibres are substantially in contact with one another with the cores of both fibres close together.

4. A method according to claim 1 or 2, in which both superposed fibres follow a helical path around the curved surface and both include an appropriate twist to ensure that their flat faces are parallel to the curved surface so that the flat faces of both fibres lie strictly parallel to the curved surface and thus the flat faces of both superposed fibres are substantially in contact with one another with the cores of both fibres are close together.

5. A method according to claim 1 or 2, in which at least one fibre is deflected from a normal plane or a helical path with appropriate twist or follows a helical path without the fibre having the appropriate twist so that the flat face of the at least one fibre tilts with respect to the curved surface, the degree of tilt being proportional to its lateral deviation along the curved surface and the sense of tilt being dependent upon the direction of its deviation, the tilting of at least one of the fibres thereby determining the separation between the cores of the superposed fibres.

6. A method according to claim 5, in which one fibre lies in a plane normal to the axis of the curved surface whilst the other fibre initially lies in a plane normal to the axis of the curved surface but displaced axially along the curved surface, the other fibre being displaced to superpose it on top of the one fibre, the displacement causing the other fibre to tilt with respect to the curved surface and the flat face of the one fibre.

7. A method according to claim 5, in which one fibre lies in a plane normal to the axis of the curved surface whilst the other fibre initially lies in a plane normal to the axis of the curved surface but displaced axially along the curved surface, both fibres being moved towards one another until they are superposed and so both deviate from their initial positions in opposite directions so that the fibres tilt in opposite senses.

8. A method according to claim 5, in which the space between the inclined flats of the two fibres is filled by an optical material the refractive index of which changes with temperature, illumination, or application of an electric field.

9. An optical fibre junction made by a method in accordance with claim 1 or 2.

* * * * *